(12) United States Patent
Gilgen (10) Patent No.: US 7,336,839 B2
(45) Date of Patent: *Feb. 26, 2008

(54) DIGITAL VIDEO COMPRESSION COMMAND PRIORITY

(75) Inventor: Robert L Gilgen, Westford, MA (US)

(73) Assignee: Avocent Corporation, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/334,556

(22) Filed: Jan. 19, 2006

(65) Prior Publication Data

US 2006/0120460 A1  Jun. 8, 2006

Related U.S. Application Data

(63) Continuation of application No. 10/875,678, filed on Jun. 25, 2004, now Pat. No. 7,006,700.

(51) Int. Cl.
*G06K 9/36* (2006.01)
(52) U.S. Cl. .................................... 382/240
(58) Field of Classification Search ............... 382/232, 382/234, 238–240, 244–248; 358/426.01, 358/426.02, 426.13, 426.14; 348/384.1, 348/390.1, 404.1, 424.2; 341/51, 63, 67; 375/240, 240.01–240.02, 240.1, 240.12–240.14; 386/109
See application file for complete search history.

(56) References Cited

U.S. PATENT DOCUMENTS 3,935,379 A   1/1976   Thornburg et al.
4,005,411 A   1/1977   Morrin, II
4,134,133 A   1/1979   Teramura et al.
5,339,164 A   8/1994   Lim
5,519,874 A   5/1996   Yamagishi et al.
5,526,024 A   6/1996   Gaglianello
5,757,973 A   5/1998   Wilkinson (Continued)

FOREIGN PATENT DOCUMENTS

EP   0495490   7/1992

(Continued)

OTHER PUBLICATIONS

International Preliminary Examination Report in Corresponding PCT Application No. PCT/US2003/030650, mailed Aug. 25, 2006.

(Continued)

*Primary Examiner*—Jose L. Couso
(74) *Attorney, Agent, or Firm*—Davidson Berquist Jackson & Gowdey LLP (57) ABSTRACT

A video compression system for compressing a stream of digital video data is disclosed. Known run-length encoding is applied whenever possible to the digital video data stream. When a run is not identified, the encoder determines whether a consecutive series of pixels are identified from only two different colors, and if so creates a make-series command to create bytes with bits encoded as a stream of binary values corresponding to the two pixel colors as they occur in the consecutive series. The make series command continues for as many bytes as the consecutive series of bits will fill, except that, when a make series command applies again to a byte of make-series bits, the make series command is preempted by the applicable run length encoding.

19 Claims, 6 Drawing Sheets

U.S. PATENT DOCUMENTS

| | | |
|---|---|---|
| 5,796,864 A | 8/1998 | Callahan |
| 6,008,847 A * | 12/1999 | Bauchspies ............ 375/240.01 |
| 6,094,453 A | 7/2000 | Gosselin et al. |
| 6,124,811 A | 9/2000 | Acharya |
| 6,233,226 B1 | 5/2001 | Gringeri |
| 6,243,496 B1 | 6/2001 | Wilkinson |
| 6,327,307 B1 | 12/2001 | Brailean et al. |
| 6,453,120 B1 | 9/2002 | Takahashi |
| 6,496,601 B1 | 12/2002 | Migdal et al. |
| 6,512,595 B1 | 1/2003 | Toda |
| 6,542,631 B1 | 4/2003 | Ishikawa |
| 6,574,364 B1 | 6/2003 | Economidis et al. |
| 6,829,301 B1 * | 12/2004 | Tinker et al. .......... 375/240.12 |
| 6,871,008 B1 * | 3/2005 | Pintz et al. ..................... 386/95 |
| 6,898,313 B2 * | 5/2005 | Li et al. ..................... 382/176 |
| 6,940,900 B2 | 9/2005 | Takamizawa |
| 7,006,700 B2 | 2/2006 | Gilgen |
| 2004/0062305 A1 | 4/2004 | Dambrackas |
| 2005/0025248 A1 | 2/2005 | Johnson et al. |
| 2005/0069034 A1 | 3/2005 | Dambrackas |
| 2005/0135480 A1 | 6/2005 | Li et al. |
| 2005/0286790 A1 | 12/2005 | Gilgen |
| 2006/0120460 A1 | 6/2006 | Gilgen |
| 2006/0126718 A1 | 6/2006 | Dambrackas et al. |
| 2006/0126720 A1 | 6/2006 | Dambrackas |
| 2006/0126721 A1 | 6/2006 | Dambrackas |
| 2006/0126722 A1 | 6/2006 | Dambrackas |
| 2006/0126723 A1 | 6/2006 | Dambrackas |

FOREIGN PATENT DOCUMENTS

| | | |
|---|---|---|
| JP | 01-303988 | 12/1989 |
| JP | 08-033000 | 2/1996 |
| JP | 08-263262 | 10/1996 |
| JP | 11-308465 | 11/1999 |
| JP | 2002-165105 | 6/2002 |
| WO | WO 02/062050 A2 | 8/2002 |

OTHER PUBLICATIONS

PCT International Search Report in corresponding PCT Application No. PCT/US2003/030650 mailed Apr. 20, 2006.

PCT International Search Report for PCT/US03/10488, International filing date Jul. 28, 2003.

PCT International Search Report for PCT/US05/17626, International filing date Jan. 3, 2006.

PCT International Search Report for PCT/US05/19256, International filing date Oct. 25, 2005.

* cited by examiner

DIGITAL VIDEO COMPRESSION COMMAND PRIORITY

CROSS-REFERENCES TO RELATED APPLICATIONS

This application relates to U.S. Pat. application Ser. No. 10/260,534, "Video Compression System" filed on Oct. 1, 2002, now U.S. Pub. application Ser. No. US2005/0069034A1, (the "Dambrackas Application"), the entire contents of which are incorporated herein by reference.

FIELD OF THE INVENTION

This invention relates to computer data processing, and more particularly to computer video compression.

BACKGROUND OF THE INVENTION

The Dambrackas Application described a new video compression system optimized to take advantage of redundancies typically occurring on computer screens and also optimized to take advantage of types of video loss acceptable to real-time interactive computer users. In the present application, a familiarity with the Dambrackas application is assumed so that all of the details of the Dambrackas application need not be repeated herein. In one of the example embodiments described in that application, captured frames of computer video were encoded into combinations of five different, uniquely chosen commands, which were selected in sequence based on their ability to most efficiently compress the captured video. The five commands described therein were (1) copy old pixels from an earlier frame, (2) copy pixel from the left, (3) copy pixel from above, (4) make a series of pixels using a 2-color set, and (5) make one or more pixels using a specified color. The Dambrackas application recognized that each command provided unique efficiencies when employed in an hierarchical structure.

According to the Dambrackas application, the make pixel command took the lowest hierarchical position, followed in ascending hierarchical order by: the make series command, the copy above command, the copy left command, and the copy old command. In other words, an encoder encoding video using the Dambrackas system would try to make the copy old command first, and if that did not qualify, it would attempt to make the copy left command, followed by the copy above command, followed by the make series command, and finally resorting to the make pixel command. Dambrackas also recognized that as among the copy old, copy left, and copy above commands the hierarchical priorities only apply if two or more of those commands simultaneously qualify on a current pixel. Further, as long as one copy command (copy old, copy left, or copy above) qualified, Dambrackas disclosed that the encoder should continue with that copy command until it no longer qualified.

BRIEF SUMMARY OF THE INVENTION

The present invention improves upon the Dambrackas video compression system by providing an alternative prioritization system for compression commands. In the presently preferred embodiment of the present invention, command priority is identical to that disclosed in the Dambrackas application, except that the run length commands cannot be pre-empted by any other command. In summary, the run length commands are given the highest priority such that (1) if a run is ongoing, then no other command will pre-empt the run length command, and (2) a make series command will not continue into a second or subsequent byte if any of the run length commands could also be used to represent the pixels in that second or subsequent byte. If the run length command and the make series command all fail to produce compression for a pixel, then as a last resort, a make pixel command will be produced.

DETAILED DESCRIPTION OF THE INVENTION

Figure 1:
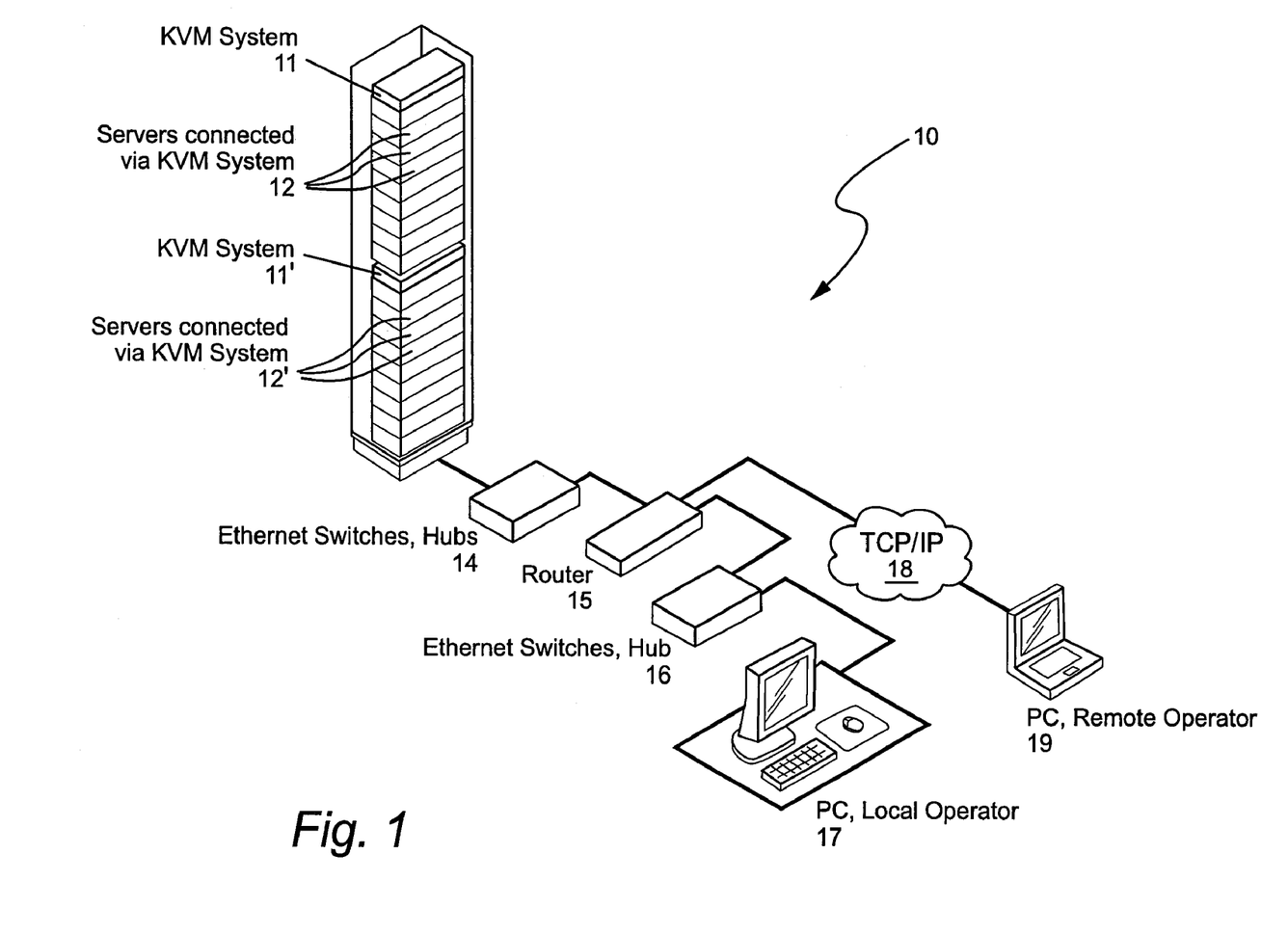
FIG. 1 is a schematic representation of an example system into which the present video encoding may be implemented.

The present invention can be implemented with any hardware or software that aims to send computer video over a communication channel, including over an intervening network. One such example embodiment is shown in FIG. 1, which is described by way of example rather than limitation. In FIG. 1, system 10 includes a KVM system 11 shown in a rack of servers 12. The KVM system 11 can be any standard type of digital KVM system, such as, for example, the so-called DS1800 manufactured by Avocent Corporation of Huntsville, Ala. The servers 12 communicate via the KVM system 11 with remote users, such as local operator 17 or remote operator 19. In the embodiment of FIG. 1, the servers 12 are shown as computer servers in a rack, but the servers 12 may be blades, free standing PCs, or any other set of computers communicating with a KVM system 11. Further the KVM system per se is not required by the present invention, which can be implemented in any digital video environment including for unlimited kinds of digital video sources.

In the example, the KVM system 11 receives video information from a selected server 12 and communicates that video information via a digital signal onto the remainder of the system 10. The KVM system 11 and servers 12 may also be accompanied in a common rack with KVM system 11' and servers 12', providing similar server selection functions. When an operator, such as local operator 17 or remote operator 19 inputs keyboard or mouse signals, or other input device signals to the KVM system 11/11' destined for a pre-selected server 12/12', the server receives the keyboard and mouse signals as though the keyboard and mouse of the operator 17/19 were directly connected to the selected server. The operations of such KVM systems are known in the industry and will not be elaborated upon here. The KVM system will, in response to the keyboard and mouse inputs to the selected server, receive the video output from the selected server and communicate that video output back to the particular operator 17/19. The monitor at the operator 17/19 will then display the video signal return from the selected server 12/12'.

Between the KVM system 11/11' and the operator 17/19, various forms of digital communications lines may be implemented. One such example is shown in FIG. 1 in which Ethernet switches 14 and 16 communicate with router 15 to provide connectivity between local operator 17 and KVM system 11/11'. Alternatively, remote operator 19 communicates via TCP/IP network 18 (or any such other kind of network) to the router 15, Ethernet switch 14, and KVM system 11/11', as shown. Still other alternative embodiments for communicating video information between a monitor (such as on operator 17/19) and a video source (such as in the KVM system 11/11') can be envisioned and are contemplated within the present invention. The type of digital system between the operator 17/19 and the KVM system 11/11' is not critical to the present invention, nor is the digital protocol for communicating between the operator 17/19 and KVM system 11/11'.

Figure 7:
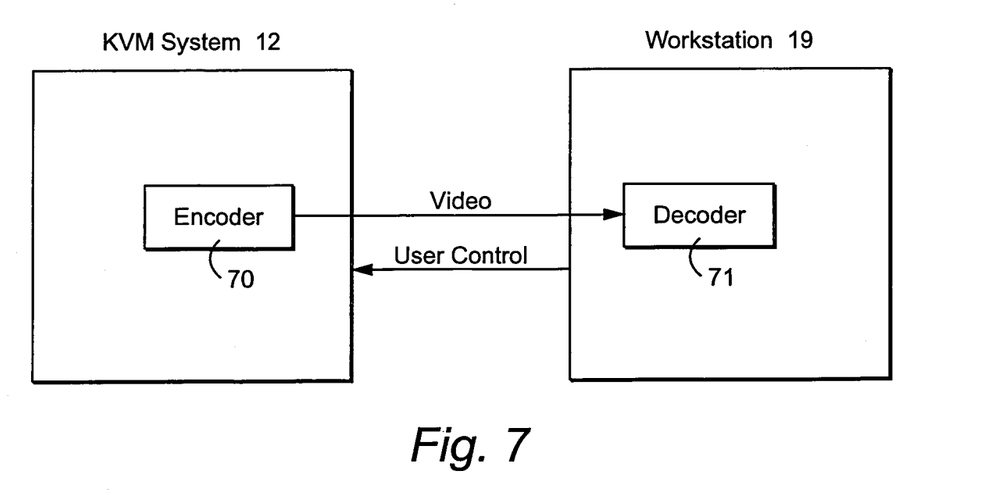
FIG. 7 is another example structure into which the example embodiments of FIGS. 5 and 6 may be implemented.

In the preferred embodiment, the present invention provides an encoding/decoding protocol for the video being communicated by the server 12/12' via the KVM system 11/11' and the intervening digital communication channels to the local operator 17 or remote operate 19. Generally, the servers 12/12' will include the encoders for encoding the video produced by the servers 12/12' and intended for communication along the digital communication path between the KVM system 11/11' and the appropriate operator 17/19. Similarly, the operator 17/19 will include the decoder required to decode the digital video signal received from the digital communication channel for re-creation of the video on the appropriate monitor. A generic representation of an example embodiment is shown in FIG. 7 when KVM system 11 incorporates encoder 70 to encode video in accordance with the invention, and workstation 19 incorporates a decoder 71 to decode the video for display.

Whether the encoders at the servers 12/12' or the decoders at the operator 17/19 are hardware or software is not critical to the present invention, which may be realized in either hardware or software at either end. To the extent the present disclosure refers to or implies hardware or software requirements at either end for the encoders/decoders, the present invention should not be limited to such.

Figure 2:
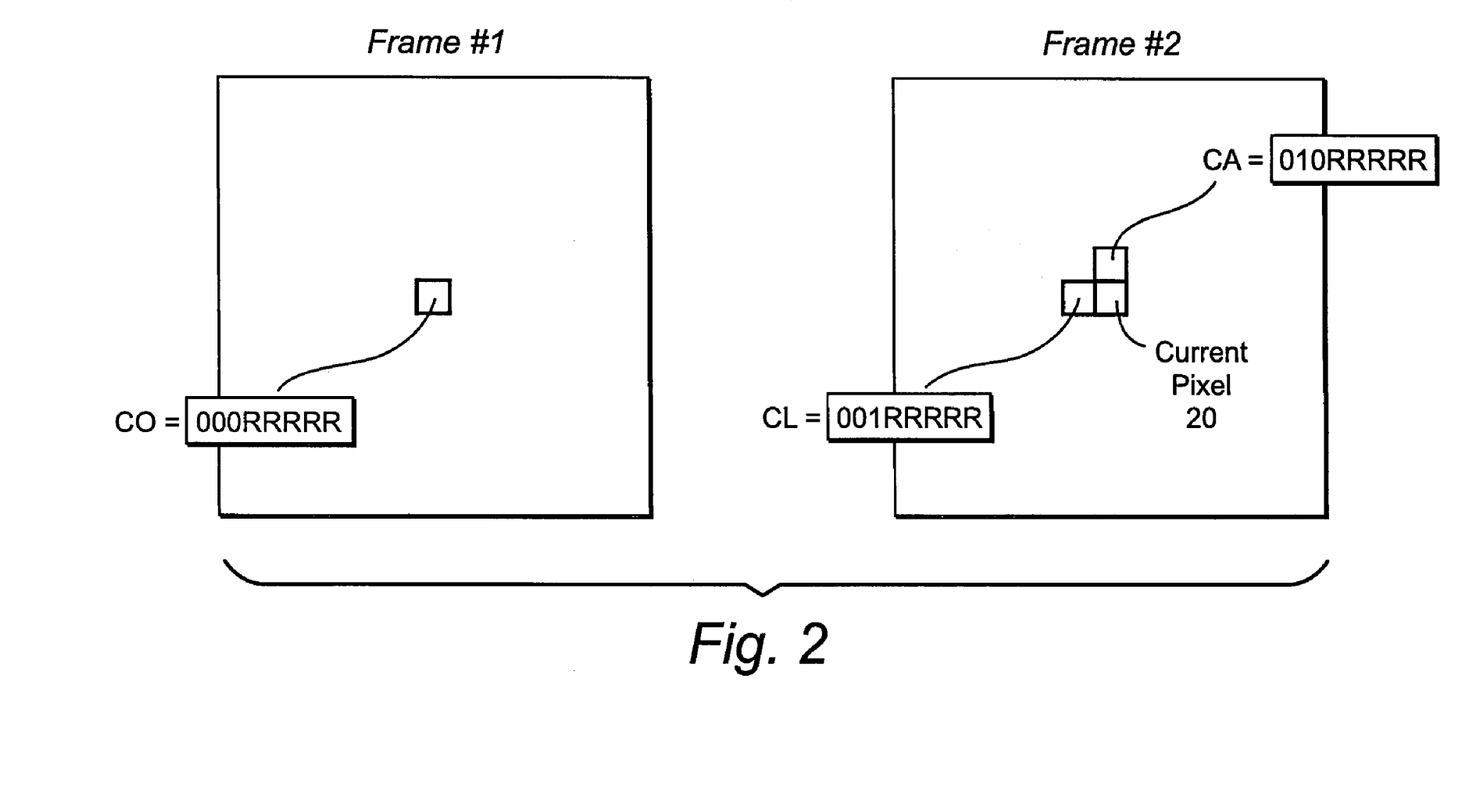
FIGS. 2 through 4 are illustrative video frames illustrating the five commands employed by the preferred embodiment of the present invention.
Figure 3:
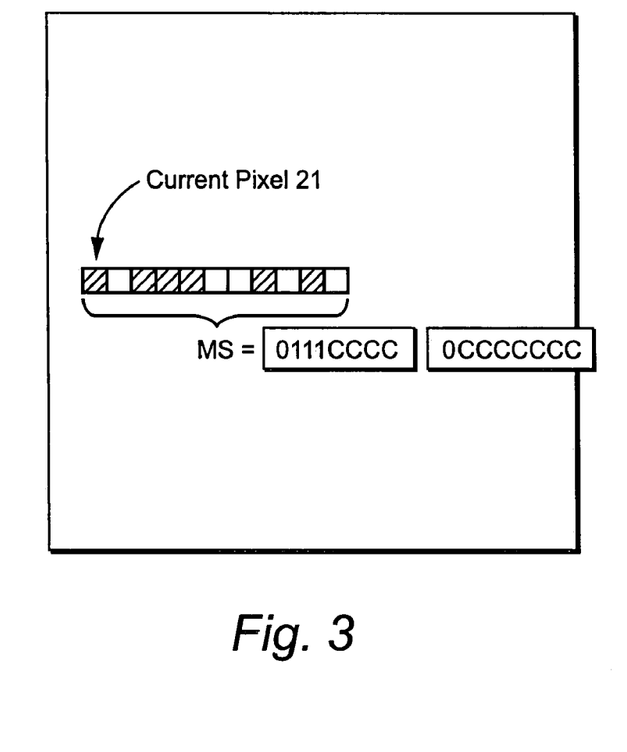
Figure 4:
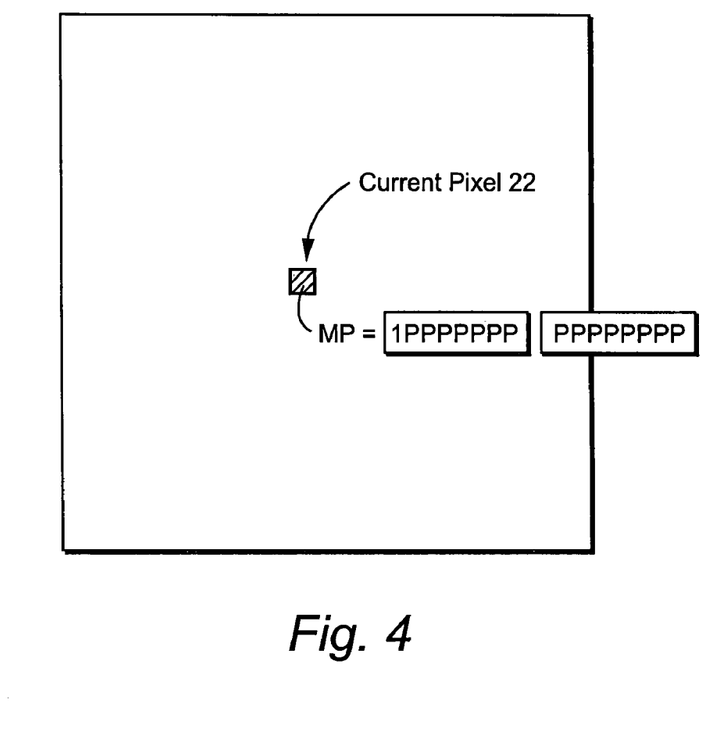

FIGS. 2 through 4 illustrate the command types provided by an example embodiment. In FIG. 2, examples of some run length commands are described, while FIG. 3 describes the make series command and FIG. 4 describes the make pixel command.

Beginning with the make pixel command in FIG. 4, which is the most data intensive command and thus the least preferable, the current pixel 22 at the location in the frame shown in FIG. 4 is defined by a color, which is represented by a two byte make pixel (MP) command. The details of the make pixel command (as well as the other commands referred to in FIGS. 2 and 3) will be described in generalities herein, but a more detailed description of how these commands operate, and appropriate alternative commands for them, is found in the Dambrackas application. In general, the make pixel command provides 15 bits of color, meaning five bits of red, five bits of green, and 5 bits of blue, through the two-byte command. As shown in FIG. 4, the two bytes are made up of a first control bit followed by 15 color bits. The make pixel command is inefficient compression because it requires two bytes of information to record a single pixel of color. Accordingly, the make pixel command is the least preferred of the various commands shown in FIGS. 2-4.

Looking now at FIG. 3, the make series (MS) command is described, which is the next least-favorite pixel command. The make series command attempts to encode a series of pixels that the encoder has previously determined will be drawn from only a two color selection. In essence, the encoder determines that for the current pixel 21 and a certain number of subsequent pixels thereafter, all of the pixels come from one of only two different colors. As it turns out, in computer video, the make series command can apply frequently, because of the amount of text, and other two-color video that exists in computer video (as opposed to, for example, television video). The format of the make pixel command is shown in FIG. 3. That format may result in one byte, two bytes, three bytes, or more depending on the length of consecutive pixels that fall within the two-color bit requirement. In the example of FIG. 3, the make series command comprises two bytes, which encodes 11 pixels. In the first byte, the first four bits (0111) are a control code telling the decoder that what follows is a make series command, and that the make series command in the present byte is followed by a second subsequent byte. The manner in which the make series control code defines that information is described in the Dambrackas application and will not be repeated herein. The second byte of the make series code includes a first control bit telling the decoder that no further make series byte will follow, followed by 7 pixel bits. In the end, for just the example of FIG. 3, the decoder will read the make series command as an eleven bit series with the eleven bits identified by their state as one or the other of the two colors in the two color group.

In the make series command, a series can be made from four bits (the four "Cs" in the first byte shown in FIG. 3), eleven bits (the four plus seven "Cs" in the two bytes of FIG. 3), or other combinations of additional seven bits per subsequent byte. Thus, the make series command in the example shown can be made for four bits, eleven bits, eighteen bits, twenty-five bits, etc. where each incremental increase is an additional seven bits per byte in the make series command. Thus, the make series command has a minimum length of one byte and has an unlimited maximum length. As it turns out, according to the Dambrackas application, the make series command is quite important for encoding irregular patterns of two colors such as black text on a white background.

The make series command is efficient in some respects but inefficient in others. First, a single byte command can only encode 4 pixels, as shown in FIG. 3. Such a single byte, if not followed by immediately subsequent make series bytes, yield a compression ratio of only 8:1 (single byte command encodes 4:16 bit pixels). Second, in order to use the more efficient multi-byte versions of the make series command, exact numbers of pixels must be encoded (4, 11, 18, 25, . . . ), which means one can only tell if the compression is successful after seven pixels have been processed. This makes implementation in hardware awkward and makes prioritization of commands difficult.

The run length commands are described with respect to FIG. 2. The run length commands recognize that for a current pixel 20, certain correlations can be found as between the current pixel color and other previously identified pixels. Three example run length encoding commands are shown in FIG. 2 as the copy old command, copy left command, and copy above command. In the copy old (CO) command, the current pixel 20 in frame number 2 is identified as being the same pixel color as the pixel in the same location of the previous frame, frame number 1. In such a case, the current pixel 20 can be identified more efficiently than the make pixel command (FIG. 4) simply by referencing the old pixel of the previous frame. Thus, the decoder engine simply must be told "copy the old pixel" and the decoder engine need not be told what the current pixel color 20 is. The engine can then find that color from the prior frame (frame number 1). In addition, as described in the Dambrackas application, once the current pixel 20 is correlated with the same pixel location in the previous frame (CO), great efficiencies can be made by counting the number of consecutive pixels thereafter that are the same color. The command given to decoder engine, shown in FIG. 2 as CO equals OOORRRRR includes the three front pixels (OOO) identifying the copy old command, and five subsequent pixels (RRRRR) indicating the number of pixels thereafter that the decoder engine can copy as the same color. Further identification of how the copy old command can be implemented, and its alternative embodiments, will not be described herein, but can be found in the Dambrackas application.

Also shown in FIG. 2 are the copy above (CA) and copy left (CL) commands. Copy above and copy left commands operate the same as the copy old commands, except that they have a different locational relationship to the current pixel 20. In the copy above command, the current pixel 20 is identified by its relation to the pixel immediately above it, followed by the number of pixels (RRRRR) which the decoder engine can thereafter copy from the same color. Similarly, the copy left command identifies the current pixel 20 in relation to the pixel immediately to its left. The present invention is not limited only to the run-length commands described in FIG. 2, but can apply to any other kind of run-length command, whether now-known or discovered in the future.

In the presently preferred example embodiment of the present invention, command priority is altered to provide the highest priority to the run length commands such that no other command may pre-empt any run length command. If more than one run type is active (i.e., applies to a current pixel), then the one with the largest pixel count takes priority. If there is a tie between run-length commands, then copy old has highest priority, copy left has next highest priority, and copy above has lowest priority. The preemption by run length commands applies not only to the MS command per se, but also to every subsequent byte that may be added to a current MS command. If an MS command can produce a four pixel command, and none of the other available run-length commands can encode the same four pixels, then the MS command will be produced. If the next seven pixels can be used to produce a one byte extension to the MS command, this extension will only be produced if none of the three run-length commands can be used to also represent the same seven pixels. If the next seven pixels can be used to produce a one byte extension to the MS command and none of the available run length commands can also represent the same seven pixels, then the one byte extension to the MS command will be applied (similarly to the two byte command shown in FIG. 3). The same rules will apply to every second and subsequent byte extension to the MS command. Namely, every second subsequent extension to the MS command will be tested before it is created as a second or subsequent byte to see whether one of the run length commands applies, before the second or subsequent MS byte extension is employed.

Of course, if the run length commands and the MS command fail to produce compression for a pixel, then the MP command will be produced as a last resort.

Figure 6:
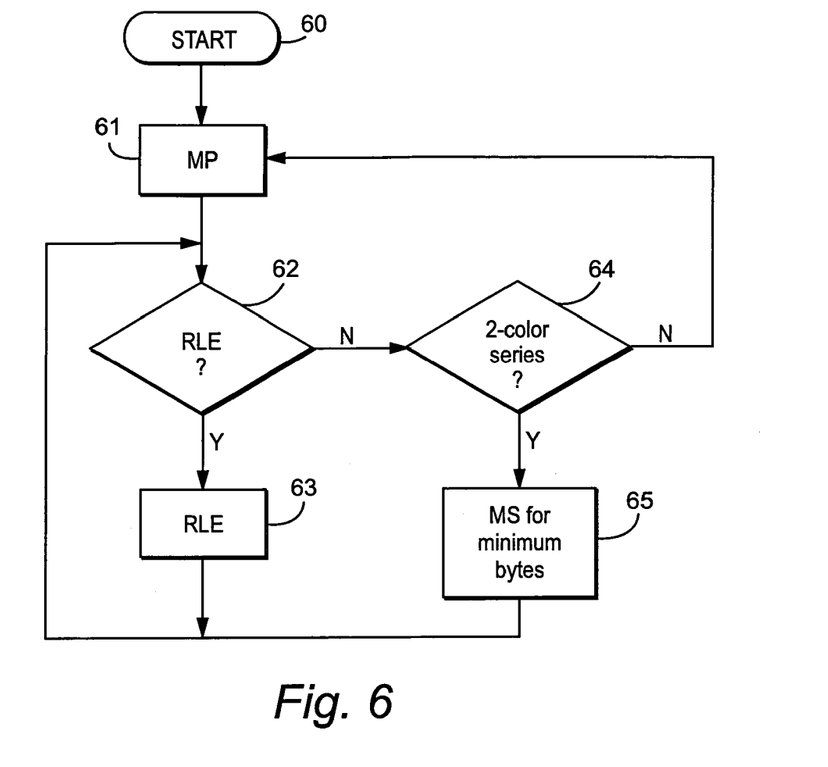
FIG. 6 is another example embodiment of the prioritization according to the present invention.

A first example embodiment of the present prioritization is shown in FIG. 6. There, the encoder 70 (FIG. 7) begins at the start step in receiving video from the video processor of the server that has been selected by the KVM system 11. Because the first pixel produced by the video card will have no relation to any other pixel (because it is the first and only), the first step 61 must be to make a pixel, such as that shown in FIG. 4. Thus, a two byte make pixel command is produced in the first step 61. Thereafter, the encoder inquires as to whether any run length encoding (RLE) command applies to the next subsequent pixel. (Of course, for the second pixel produced by the server, the only run length command that could apply would be copy left (CL)). If, at step 62, the encoder determines that a run length command can be employed for the next pixel, the run length command is employed for that pixel and the "RRRRR" subsequent pixels to which the same color applies. Thus, at step 63, the run length encoding—taking one of the forms of, for example, CO, CL, or CA of FIG. 2—are produced by the encoder 70. After the run length encoding of step 63, a next pixel is retrieved and step 62 is repeated.

Once the run length encoding inquiry at step 62 determines that no run length encoding applies to a next pixel, the flow moves to step 64 which inquires as to whether the two color series commands apply to a next subsequent set of pixels. If a make series (two-color series) command can be made for the next pixel and subsequent pixels, the make series command is created for the minimum number of bytes in step 64. The minimum number of bytes in step 64 will be defined by those number of bytes for which the make series command applies but for which no run length encoding command also applies. Thus, at step 64, if the make series command applies for four two-color series bits and thereafter a run length encoding applies for the next subsequent bit, step 64 will result in a minimum number of bytes equal to one for the four two-color series bits. Thereafter, flow will return to step 62 where the run length encoding will be employed for the next subsequent pixels.

If, however, the first four bits are identified at step 64 and the next seven bits thereafter also satisfy the make series requirements, but don't satisfy any run length requirements, then the make series step 65 will produce at least two minimum bytes for the eleven two-color series bits. The same inquiry continues for each of the next subsequent sets of seven bits at steps 64 and 65 such that the make series command 65 is only producing the minimum number of make series bytes for which no run length encoding command can be employed at step 62/63.

Finally, if no run length encoding applies at step 62 for a next pixel, and no make series command qualifies at step 64 for the same pixel (or set of pixels in a next byte), then the flow returns to step 61 and a make pixel command is employed for that particular pixel. The next pixel then moves to step 62 to determine whether a run length encoding command applies to it, as described in the previous references to step 62 above. The description of FIG. 6 above is made with respect to the encoder. In the decode process, decoder 71 receives the stream of bytes produced by the encoding steps shown in FIG. 6 and retrieves the pixel colors encoded by the encoder. For the decode process, no decisions need to be made regarding command priority. The command stream instructs the decoder exactly how to render the pixels.

Figure 5A:
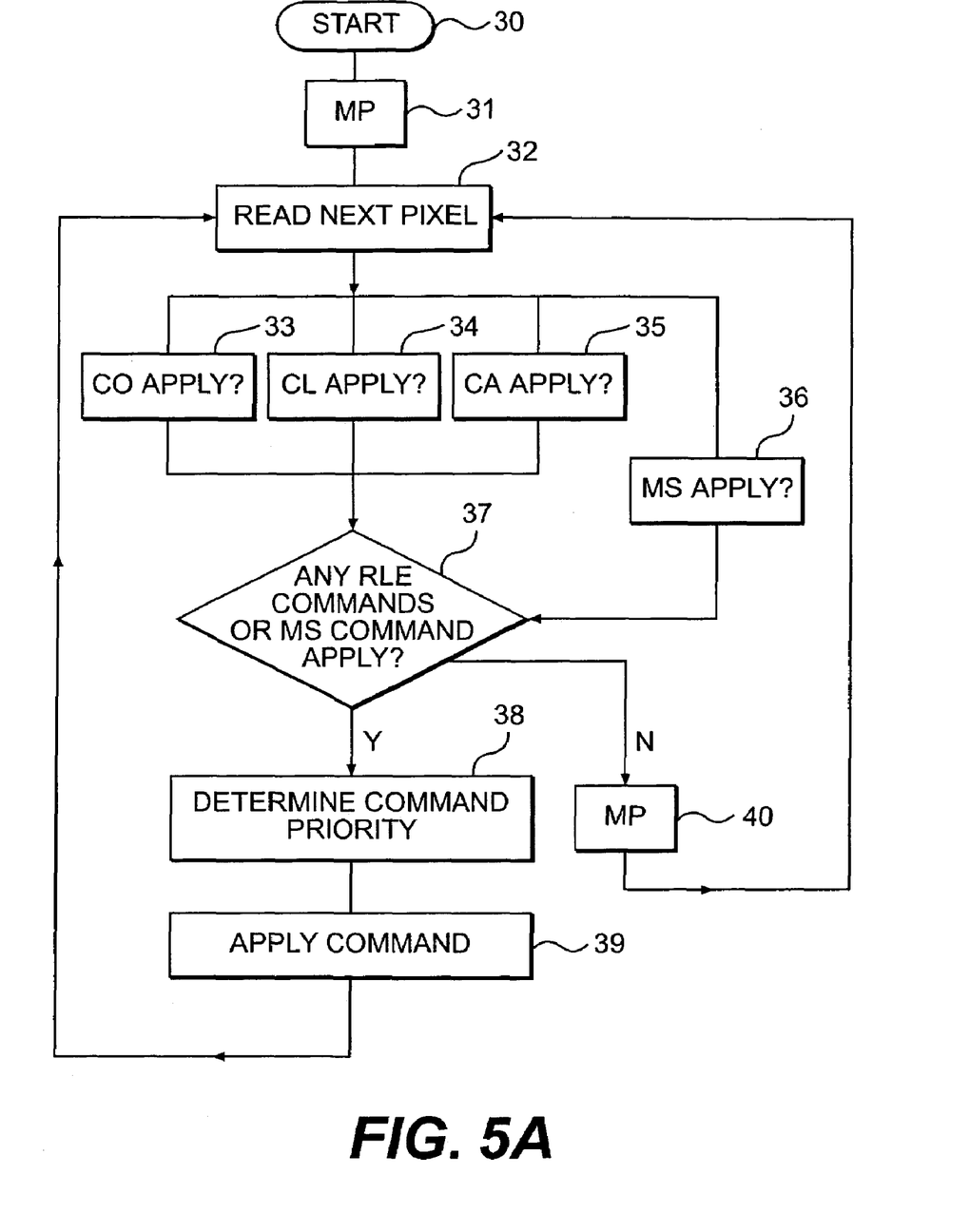
FIGS. 5A and 5B are flowcharts showing inquiry and application of the five commands in an example embodiment of the present invention.
Figure 5B:
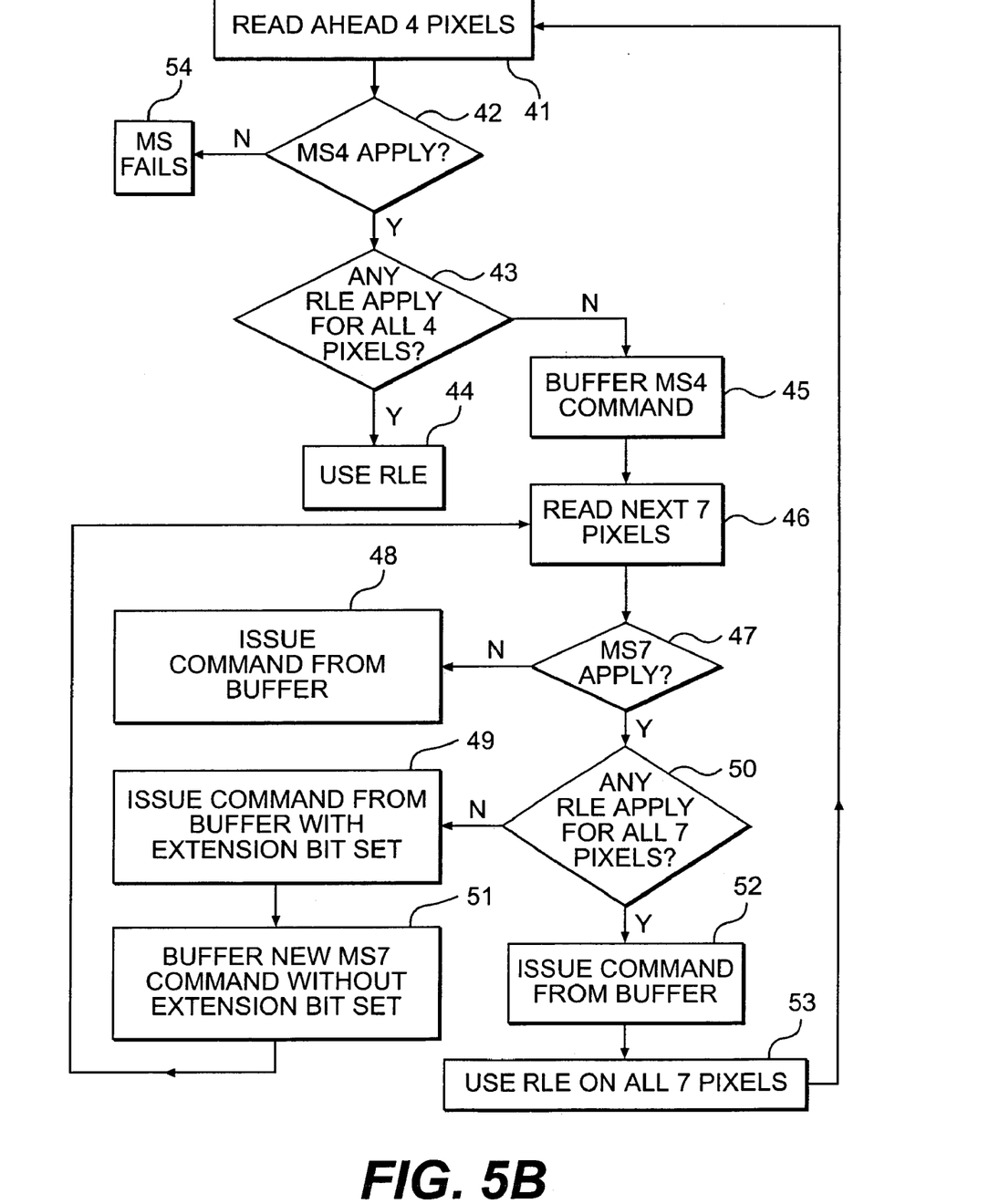

An alternative embodiment to the present invention is shown in FIGS. 5A and 5B. In this embodiment, the encoder 70 starts at step 30 and employs a make pixel command on the first pixel received by the video card of the server at step 31. At step 32, the encoder 70 reads the next pixel and begins looking for ways to compress the video. The encoder performs each of the run length command inquiries (steps 33/34/35) and the make series command inquiry (step 36) in parallel. However, it is important to remember that the make series command inquiry is only made once the appropriate number of pixels have been read to fill one make series byte. Commands that apply, that is, those that can successfully encode the current pixel and are available to be applied, are then tried on the next pixel. When a pixel is reached where all of the commands fail to encode that pixel, then it is determined which commands were still successful up to the previous pixel, and command priority hierarchy dictates which of these remaining commands to apply, for all of the pixels that have been read up to that point.

In step 33, the encoder 70 inquires whether the copy old command, the most efficient compression technique, applies to the present pixel. Part of the inquiry at step 33 includes both determining whether the condition shown in FIG. 2 for the copy old command, namely that the current pixel 20 is the same color as the pixel in the same location of the previous frame, applies. If copy old applies to the present pixel, then flow continues through step 37 to step 38. If at step 38 it is determined through command priority that the copy old command provides the longest run length in comparison to the other commands that apply, the encoder 70 applies the copy old command at 39 (yielding the OOORRRRR command shown in FIG. 2) and then reads the next pixel at 32.

In step 34 the encoder inquires whether the copy left command, the second most efficient compression technique, applies to the present pixel. If copy left applies to the present pixel, then flow continues through step 37 to step 38. If at step 38 command priority determines that copy left is the most efficient command that applies, the encoder applies the copy left command at step 39 and then reads the next pixel at 32.

In step 35 the copy above inquiry is made. The encoder inquires whether copy above applies and also determines whether the copy above command is the most efficient run length encoding as between copy old, copy left, copy above, and make series commands that apply. If copy above applies to the present pixel, then flow continues through step 37 to step 38. If at step 38 command priority determines that copy above is the most efficient command among those that apply, the encoder applies the copy above command at step 40 and then reads the next pixel at 32.

If the make series command applies to the present pixel, shown in step 36 of FIG. 5A and more fully by FIG. 5B, then flow continues through step 37 to step 38. If the make series command is the most efficient command among those that apply to the present pixel, determined through command priority at step 38, make series will be applied at step 39.

Step 37 determines if any commands of steps 33/34/35/36 apply to the present pixel, and as a last resort, if none of these commands apply and there were no previously successful commands up to the previous pixel, the make pixel command is applied at step 40 and flow then returns to step 32.

In the make series inquiry and application, illustrated by FIG. 5B, the encoder at step 41 first reads ahead four pixels to fill one make-series byte. Next it is determined at step 42 whether the make series command applies with respect to those four pixels. In other words, at step 42 the encoder determines whether those four pixels are all defined by a group consisting of only two colors, which two colors were previously defined by the prior two uniquely colored pixels. If at step 42 the make series command does not apply to those four pixels, then the make series inquiry and application procedure ends, shown at step 54, and flow would then move on from step 36 to step 37 as shown in FIG. 5A. If the make series command does apply, the encoder next makes an inquiry at step 43 as to whether any run length encoding commands apply for all four pixels. If so, run length encoding is used to represent those four pixels at step 44. If at the step 43 inquiry it is determined that no run-length encoding applies for all four pixels, the make series command is buffered at step 45 and flow continues to step 46. At step 46, the encoder reads the next seven pixels to fill a second subsequent byte in the make series progression. Then, at step 47, the encoder determines whether the make series command applies for the second/subsequent byte of seven pixels. If it does apply for all seven pixels, flow continues to step 50, but if it does not, the buffered command is issued at step 48. At step 50 the encoder makes an inquiry as to whether any run length encoding commands apply for all seven pixels. If so, the buffered command is issued at step 52, run-length encoding is applied to represent all seven pixels at step 53, and flow then returns to read ahead the next 4 pixels at step 41. If no run-length command applies for all seven pixels, then at step 49 the buffered command is issued with the extension bit set and flow continues to step 51. As explained in detail in the Dambrackas Application, the extension bit, also called the continue bit, indicates whether or not the current command extends to the next byte of data. At step 51, the new make-series command is buffered without the extension bit set, and flow then returns to step 46 to read the next seven pixels. It is important to remember that in this embodiment, the run length encoding commands can interrupt the second/subsequent bytes of an MS command only if all seven pixels encoded by that second/subsequent byte of the MS command can also be encoded by a single RLE command.

As one can see from studying FIG. 5 and the above description, the example embodiment attempts to apply run length encoding via CO, CL, or CA commands as much as possible, giving priority even to continued application of each of the CO/CL/CA commands, if any one of them actually applies to a given pixel. Further, once the make series command is entered, the make series command is not automatically continued for subsequent MS bytes, but is evaluated for each subsequent byte to determine whether or not an alternative run length encoding command can be used instead of the subsequent MS command byte. Once run length encoding is found for a pixel in the midst of an MS command analysis, the previously formed MS command bytes are assembled and flow returns to the more efficient run length encoding commands at steps 33/34/35.

The present invention thus provides a new command priority with a goal to use the command which most efficiently encodes all of the pixels since the last command was sent. The command priorities become important especially with respect to the make series command, which can monopolize large sections of an image if the image contains only two colors. Rather than allow the MS command to monopolize those large sections, run length encoding, which provides higher efficiency, is first consulted to determine whether or not it can apply before further MS command bytes are added.

In an alternative example embodiment of the present invention, an RLE command will interrupt the second/subsequent byte of an MS command if a certain number of the seven pixels encoded by that second/subsequent byte of the MS command can also be encoded by a single RLE command.

Various alternative embodiments, providing varying degrees of efficiency, can be recognized for when the run length encoding commands will interrupt a second/subsequent MS commands byte.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A video compressor, comprising:
   an input to receive a serial stream of video pixels corresponding to video pixel colors; and
   an encoder implementing a set of encoding protocols including at least one run-length encoding protocol and a two-color binary encoding protocol corresponding to a two-color series of said video pixel colors, said encoder including a buffer storing a first number of pixels from the serial stream of video which have been determined to be encodable using the two-color binary encoding protocol and a second number of pixels from the serial stream of video which are adjacent to the first number of pixels which also can be encoded using the two-color binary encoding protocol, said encoder reading the second number of pixels to determine if the second number of pixels can be encoded using the run-length encoding protocol and, if so, outputting the first number of pixels encoded using the two-color binary encoding protocol and encoding using the run-length encoding protocol the second number of pixels and video pixels adjacent to second number of pixels that also can be encoded using the run-length encoding protocol, wherein the two-color binary encoding protocol encodes video pixels of the serial stream using a single bit per pixel to select between a first color of the two colors and a second color of the two colors.

2. A video compressor according to claim 1, wherein when the encoder determines, for a current byte after the second number of pixels, that the current pixel and a next number of subsequent pixels cannot be run-length encoded but can be two-color binary encoded, encoding the current pixel and the next number of subsequent pixels according to the two-color binary encoding but only as long as the subsequent pixels cannot also be run-length encoded, the encoder interrupting the two-color binary encoding for a next byte after the current pixel and the next number of subsequent pixels when the next byte and pixels adjacent the next byte can again be run-length encoded and resuming run-length encoding even though the next byte and the pixels adjacent the next byte could also be two-color binary encoded.

3. A video compressor according to claim 1, wherein the first and second colors of the two-color series associated with the two-color binary encoding are dynamically defined by exactly two consecutive video pixels in the serial stream of video pixels.

4. A video compressor according to claim 1, wherein the set of encoding protocols includes plural different run-length encoding protocols.

5. A video compressor according to claim 4, wherein the encoder employs a hierarchy among the plural different run-length encoding protocols.

6. A video compressor according to claim 5, wherein the hierarchy includes a fixed hierarchy that prefers certain ones of the plural different run-length encoding protocols over others of the plural different run-length encoding protocols.

7. A video compressor, comprising:
   an input to receive serial video pixel information; and
   an encoder having an established hierarchy of at least first, second and third code techniques, where the first code techniques is a form of run-length encoding, the second code techniques is a form of make-pixel encoding identifying individual colors, and the third code technique is a form of two-color binar encoding of a sequence of color information consisting of two colors, the encoder reading sequences of color information from the serial video pixel information and selecting for a current sequence of color information a highest applicable ranking code technique in the hierarchy of code techniques, such that when a current sequence of color information is encoded using the two-color binary encoding technique, the two-color binary encoding technique is interrupted when the sequence qualifies for the run-length encoding technique, and when a current sequence of color information is encoded using the make-pixel encoding technique, interrupting that make-pixel code technique when the sequence qualifies for the run-length encoding technique, wherein the two-color binary encoding protocol encodes video pixels of the serial video pixel information using a single bit per pixel to select between a first color of the two colors and a second color of the two colors.

8. A video compressor, comprising:
   an input to receive serial video pixel information; and
   an encoder that reads pixel colors from the serial video pixel information and (1) attempts to run-length encode as many subsequent consecutive pixel colors in the serial video pixel information as possible, and (2) when the encoder cannot encode a next pixel color in the serial video pixel information according to (1), attempts to fill a one byte payload based on a two-color series of binary bit encoding and continues to fill as many subsequent byte payloads based on the two-color series of binary bit encoding as possible until the encoder can again run-length encode a next pixel color, wherein the two-color binary encoding protocol encodes video pixels of the serial video pixel information using a single bit per pixel to select between a first color of the two colors and a second color of the two colors.

9. A video compressor according to claim 8, wherein the encoder applies another command to a next pixel color in the serial video pixel information when the encoder cannot encode the next pixel color according to (1) or (2).

10. A video compressor according to claim 9 wherein said another command is a command to draw a pixel according to a single color.

11. A video encoder, comprising:
   one or more code devices establishing a hierarchy of encoding commands including copy commands, two-color series commands, and individual pixel color commands,
   an input to receive a current pixel color,
   the one or more code devices determining whether a copy command applies to the current pixel color and if so, applying said copy command to the current pixel color and also to as many consecutive subsequent pixel colors to which the copy command also applies, and
   if not established copy command applies to the current pixel, the one or more code devices determining whether said two-color series command applies to the current pixel color and a predefined number of additional pixel colors together needed to payload a first byte of said two-color series command, and if not, applying said individual pixel color command to said current pixel, and if so:

the one or more code devices applying said two-color series command to form said payload of said first byte, the one or more code devices reading a next pixel color together with another predefined number of additional pixel colors together needed to payload a subsequent byte, the one or more code devices determining whether at least one copy command can encode said next pixel color and said another predefined number of additional pixel colors, and if so, applying said at least one copy command to the next pixel color and said another predefined number of additional pixel colors, and if a copy command cannot encode said next pixel color and said another predefined number of additional pixel colors, the one or more code devices determining whether said two-color series command applies to said next pixel color and said another predefined number of additional pixel colors, and if so applying said two-color series command to payload the subsequent byte.

12. A video encoder according to claim 11, wherein if (1) the one or more code devices cannot encode said next pixel color and said another predefined number of additional pixel colors using the copy command, and (2) the one or more code devices cannot encode said next pixel color and said another predefined number of additional pixel colors using the two-color series command, then the one or more code devices applying said individual pixel color command to said next pixel color.

13. A video encoder according to claim 12, wherein, after a coding command is completed for one or more bytes, the one or more code devices begin the encoding beginning with a new current pixel color.

14. A video encoder according to claim 11, wherein when the one or more code devices determine whether at least one copy command can encode said next pixel color and said another predefined number of additional pixel colors, the one or more code devices also determine whether one unique copy command can encode all of said next pixel color and said another predefined number of additional pixel colors, and if so, applying said copy command to the next pixel color and said another predefined number of additional pixel colors.

15. A digital video system, comprising:
an input to receive a digital video stream, and
an encoder to compress the digital video stream by:
  reading a current pixel color,
  attempting to run-length encode the current pixel color and as many subsequent consecutive pixel colors as possible,
  if said run-length encoding does not apply to said current pixel color, attempting to encode said current pixel color and a number of subsequent consecutive pixel colors to fill one byte payload based on a two-color series of bit encoding,
  continuing to encode additional subsequent consecutive pixel colors with two-color series bit encoding until (1) run-length encoding again applies or (2) the two-color series bit encoding does not apply; and
an output to deliver the compressed digital video stream from the encoder, and
a decoder to receive the compressed digital video stream and to substantially retrieve the digital video stream.

16. A digital video system according to claim 15, wherein the encoder applies a separate command to an individual pixel of color when neither the run-length encoding nor the two-color series bit encoding applies to the individual pixel of color.

17. An encoder, comprising:
a code device to establish a hierarchy of at least first and second code techniques, where one of the code techniques is a form of run-length encoding, and another of the code techniques is a form of make-pixel encoding using a specified color,
an input to receive at least one pixel color,
the code device applying a selected one of the first and second code techniques with preference for the highest ranking code technique in the hierarchy of code techniques, and when said one pixel color is encoded using said second code technique, interrupting said second code technique when a next sequence of pixel colors also qualifies for said first code technique, and encoding said next sequence of pixel colors by said first code technique instead of said second code technique.

18. The compressor as claimed in claim 1, wherein the second number of pixels is seven.

19. The compressor as claimed in claim 7, wherein the sequence qualifies for the run-length encoding technique when seven pixels can be encoded using the run-length encoding technique.

* * * * *